J. C. Hazen,
Corn Planter.
No. 96,319. Patented Nov. 2, 1869.

Inventor.
J. C. Hazen

Witnesses.
J. H. Burridge
D. L. Humphrey

United States Patent Office.

JACOB C. HAZEN, OF WEST INDEPENDENCE, OHIO.

Letters Patent No. 96,319, dated November 2, 1869.

IMPROVEMENT IN COMBINED CORN-PLANTER AND CULTIVATOR.

The Schedule referred to in these Letters Patent and making part of the same.

I, JACOB C. HAZEN, of West Independence, in the county of Hancock, and State of Ohio, have invented certain Improvements in Combined Planter and Cultivator, of which the following is a specification.

Objective.

The object of this invention is to produce, in one machine, a planter and cultivator that can be used for either or both, at pleasure.

Drawings.

Figure 1:
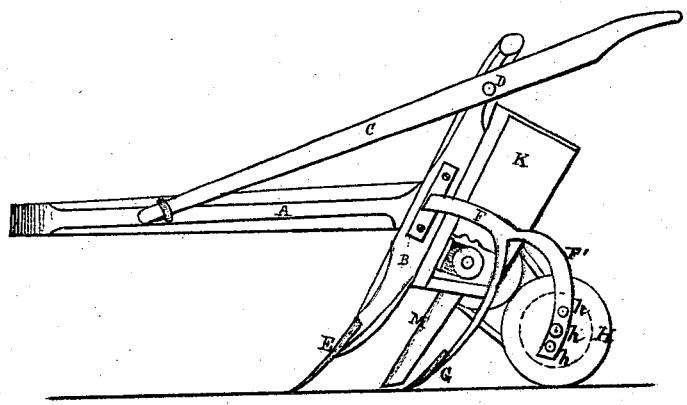
Figure 2:
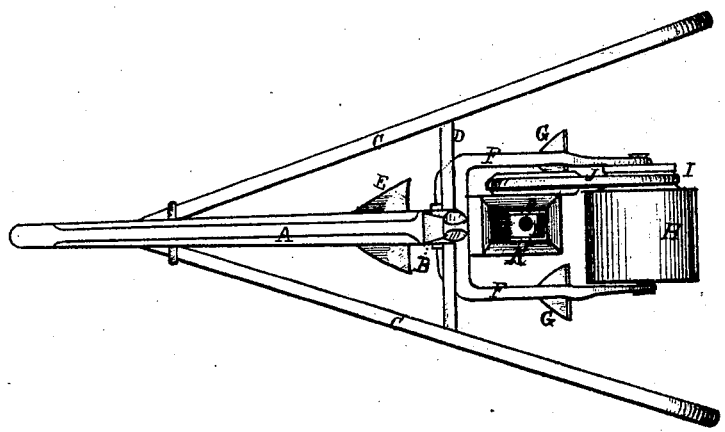

Figure 1 is a side elevation.
Figure 2, a top view.
Like letters refer to like parts.
A is the beam;
B, the standard; and
C, the handles.

The beam is mortised into the standard, as shown in fig. 1, and the handles are secured to the beam by staples or bolts, and to the upper end of the standard, by means of the pin D.

The lower end of the standard inclines a little forward and receives the share E.

Upon each side of the standard B, where the beam A joins it, are attached iron arms F. These are curved backward and downward, their lower extremity receiving the shares G, as shown in the figures.

At the termination of the horizontal portion of the arms, which in an ordinary-size implement is about one foot, they branch backward and downward, as shown at F', in fig. 1, their lower extremities receiving and supporting the roller H. Means for the adjustment of the roller to a higher or lower position, as regards the shares, is provided by means of the holes h h h, in fig. 1.

This roller has, upon its right-hand end, a pulley, around which a band, J, passes.

K represents a hopper, for containing the seed to be planted.

The bottom of the hopper is provided with a feed-roller, having seed-cups in its surface, and is of the ordinary construction, and provided with a brush to sweep off the superfluous seed.

One of the seed-cups is shown at a.

M represents a seed-tube, which conveys the seed from the cups to the ground, immediately in the rear of the share E.

The seed-roller is put in motion by the band J passing around a pulley on its right-hand end, by means of the rotation of the roller H.

Operation.

In the use of this machine as a planter, the seed is put into the hopper and the roller adjusted to the proper position to press upon the ground.

The share E opens the furrow. The seed is deposited at regular intervals.

To convert this machine into a cultivator, it is only necessary to remove the roller, seed-hopper K, and tube M.

Claim.

What I claim as my improvement, and desire to secure by Letters Patent, is—

The combination of the detachable seed-hopper K, and tube M, the standard B, the shares E G G, and adjustable roller H, the several parts being constructed and arranged as specified.

JACOB C. HAZEN.

Witnesses:
  W. H. BURRIDGE,
  J. H. BURRIDGE.